United States Patent
Lotz et al.

(10) Patent No.: US 11,401,657 B2
(45) Date of Patent: *Aug. 2, 2022

(54) METHOD FOR PRODUCING A TENSION MEMBER, TENSION MEMBER, AND USE THEREOF

(71) Applicant: ContiTech Transportbandsysteme GmbH, Hannover (DE)

(72) Inventors: Florian Lotz, Brevoerde (DE); Marius Dreier, Katlenburg (DE); Harald Koch, Northeim (DE); Iordanis Pavlidis, Volos (GR)

(73) Assignee: ContiTech Transportbandsysteme GmbH, Hannover (DE)

( * ) Notice: Subject to any disclaimer, the term of this patent is extended or adjusted under 35 U.S.C. 154(b) by 128 days.

This patent is subject to a terminal disclaimer.

(21) Appl. No.: 16/805,719

(22) Filed: Feb. 29, 2020

(65) Prior Publication Data

US 2020/0199816 A1 Jun. 25, 2020

Related U.S. Application Data

(63) Continuation of application No. 15/320,328, filed as application No. PCT/EP2015/061209 on May 21, 2015, now Pat. No. 10,648,128.

(30) Foreign Application Priority Data

Jun. 23, 2014 (DE) ...................... 10 2014 211 929.4

(51) Int. Cl.
*D07B 7/14* (2006.01)
*D07B 1/06* (2006.01)
(Continued)

(52) U.S. Cl.
CPC .......... *D07B 7/145* (2013.01); *B05B 13/0207* (2013.01); *B05C 5/0241* (2013.01);
(Continued)

(58) Field of Classification Search
CPC .......... D07B 1/0613; D07B 2201/2012; D07B 2201/2046; D07B 2201/2045;
(Continued)

(56) References Cited

U.S. PATENT DOCUMENTS

| 2,231,869 | A | 2/1941 | Phillip |
| 3,778,994 | A | 12/1973 | Humphries |

(Continued)

FOREIGN PATENT DOCUMENTS

| CH | 699751 A1 | 4/2010 |
| DE | 1271600 B | 6/1968 |

(Continued)

*Primary Examiner* — Shaun R Hurley
*Assistant Examiner* — Bao-Thieu L Nguyen
(74) *Attorney, Agent, or Firm* — Gregory Adams; David L. Cate

(57) ABSTRACT

The invention relates to a method for filling in a tension member in particular for conveyor belts, in particular a tension member which is configured as a steel cable. The method is intended to allow the full penetration of the tension member structure. Here, the method contains at least the following method steps: —introducing the individual wires (2, 2', 2", 2''', 2'''') of the strand (5) into the stranding head (1) of a stranding machine (10) and —partially or fully applying at least one coating agent to at least 50% of the individual wires (2, 2', 2", 2''', 2'''') of the strand (5) prior to the twisting of the individual wires (2, 2', 2", 2''', 2'''') to form a strand (5) or simultaneously with the twisting of the individual wires (2, 2', 2", 2''', 2'''') to form a strand (5) and —twisting the individual wires (2, 2', 2", 2''', 2'''') to form a strand (5), wherein at least 50% of the individual (Continued)

wires (2, 2', 2", 2''', 2'''') have been provided with at least one coating agent, and —making a cable from at least one strand (5).

21 Claims, 1 Drawing Sheet

(51) Int. Cl.
  *B05B 13/02* (2006.01)
  *B05C 5/02* (2006.01)
  *B65G 15/36* (2006.01)
(52) U.S. Cl.
  CPC ............ *B65G 15/36* (2013.01); *D07B 1/0613* (2013.01); *D07B 2201/2012* (2013.01); *D07B 2201/2046* (2013.01); *D07B 2201/2054* (2013.01); *D07B 2201/2077* (2013.01); *D07B 2201/2081* (2013.01); *D07B 2201/2082* (2013.01); *D07B 2207/4027* (2013.01); *D07B 2501/2076* (2013.01)
(58) Field of Classification Search
  CPC .... D07B 2201/2077; D07B 2201/2081; D07B 2201/2082; D07B 2501/2076
  See application file for complete search history.

(56) References Cited

U.S. PATENT DOCUMENTS

| | | | |
|---|---|---|---|
| 3,800,522 A * | 4/1974 | Hughes | D07B 7/145 57/215 |
| 4,005,610 A | 2/1977 | Simonsen et al. | |
| 4,110,554 A * | 8/1978 | Moore | D07B 1/147 174/101.5 |
| 4,123,894 A * | 11/1978 | Hughes | D07B 1/068 428/378 |
| 4,197,695 A * | 4/1980 | Hughes | D07B 1/0673 156/433 |
| 4,268,573 A | 5/1981 | Baillievier | |
| 4,870,814 A * | 10/1989 | Chacko | D07B 1/148 57/217 |
| 5,218,016 A | 6/1993 | Jarrin et al. | |
| 5,571,592 A * | 11/1996 | McGregor | B32B 5/26 428/71 |
| 5,687,557 A | 11/1997 | De Vos et al. | |
| 5,866,253 A * | 2/1999 | Philipps | B29C 70/521 428/374 |
| 6,232,268 B1 | 5/2001 | Narita et al. | |
| 7,917,183 B2 | 3/2011 | Ryu et al. | |
| 8,227,026 B2 | 7/2012 | McDaniel et al. | |
| 8,720,177 B2 | 5/2014 | Pottier et al. | |
| 8,863,490 B2 | 10/2014 | Boisseau et al. | |
| 8,869,851 B2 | 10/2014 | Pottier et al. | |
| 9,003,849 B2 | 4/2015 | Matsuo | |
| 9,010,079 B2 | 4/2015 | Custodero et al. | |
| 9,109,306 B2 | 8/2015 | Matsuo | |
| 9,150,984 B2 | 10/2015 | Custodero et al. | |
| 9,267,233 B2 | 2/2016 | Barguet et al. | |
| 9,617,661 B2 * | 4/2017 | Custodero | D07B 1/0626 |
| 9,617,662 B2 | 4/2017 | Pottier et al. | |
| 9,657,439 B2 * | 5/2017 | Lauer | D07B 7/145 |
| 9,815,628 B2 | 11/2017 | Lotz et al. | |
| 9,845,573 B2 | 12/2017 | Chiasson et al. | |
| 10,648,128 B2 * | 5/2020 | Lotz | B05B 13/0207 |
| 2009/0190890 A1 | 7/2009 | Freeland et al. | |
| 2009/0270533 A1 | 10/2009 | Umehara et al. | |
| 2012/0055602 A1 * | 3/2012 | Nishimura | B60C 9/0007 152/451 |
| 2012/0174557 A1 | 7/2012 | Boisseau et al. | |
| 2012/0237767 A1 * | 9/2012 | Yaniv | G10D 3/10 428/377 |
| 2014/0069074 A1 | 3/2014 | Lauer | |
| 2014/0311120 A1 * | 10/2014 | Pottier | D02G 3/48 57/232 |
| 2014/0345769 A1 | 11/2014 | Imamiya et al. | |
| 2015/0202646 A1 | 7/2015 | Fischer et al. | |
| 2016/0200518 A1 | 7/2016 | Lotz et al. | |
| 2017/0175327 A1 * | 6/2017 | Lotz | D07B 7/145 |
| 2018/0058003 A1 * | 3/2018 | Lauer | D07B 7/145 |
| 2020/0199816 A1 * | 6/2020 | Lotz | B05B 13/0207 |

FOREIGN PATENT DOCUMENTS

| | | |
|---|---|---|
| DE | 7936995 U1 | 11/1982 |
| DE | 4438420 A1 | 5/1996 |
| DE | 69029389 T2 | 5/1997 |
| DE | 69421090 T2 | 1/2000 |
| DE | 102011011112 A1 | 8/2012 |
| GB | 1215516 A | 12/1970 |
| JP | 2003012852 A | 1/2003 |
| JP | 2004277923 A | 10/2004 |
| WO | 2012107042 A2 | 8/2012 |

* cited by examiner

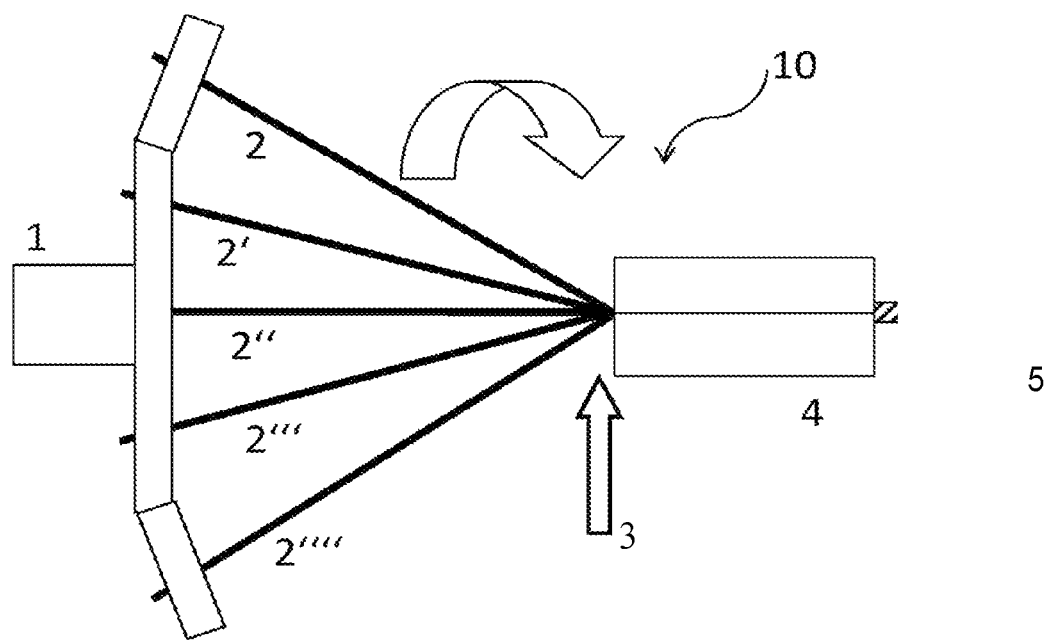

METHOD FOR PRODUCING A TENSION MEMBER, TENSION MEMBER, AND USE THEREOF

CROSS-REFERENCE TO RELATED APPLICATIONS

This Patent Application is a Continuation Application of, and claims priority to, U.S. Nonprovisional patent application Ser. No. 15/320,328 filed Dec. 20, 2016 as a National Stage Entry of PCT/EP2015/061209, filed May 21, 2015, which is incorporated herein in its entirety, by reference. This Patent Application also claims priority to German Patent Application No. 10 2014 211 929.4 filed Jun. 23, 2014, which is incorporated herein in its entirety, by reference.

FIELD OF THE INVENTION

The invention relates to a method for producing a tension member, in particular for conveyor belts, in particular a tension member which is configured as a steel cable.

BACKGROUND OF THE INVENTION

Conveyor belts have a bearing-side and a running-side cover plate, each from a polymer material having elastic properties, and an embedded tension member in the form of cables that in the longitudinal direction of the conveyor belt run in parallel and that may be constructed substantially from steel.

The tensile-force transmitting carcass of a conveyor belt is composed of textile and/or steel cable inserts which are typically surrounded by at least one adhesive rubber mixture. The carcasses are surrounded on all sides by wear-resistant rubber cover plates and a rubber edge protector. Additionally, various penetration-protection installations may also be present if required.

Conveyor belts where the carcass consists essentially of steel cables are known as steel-cable conveyor belts. Steel-cable conveyor belts can make excellent transport performance possible even under very adverse conditions. Their robust construction guarantees both high breaking strength when very high levels of conveying performance are required and also good resistance to harsh treatment. They are generally particularly abrasion-resistant, rot-resistant, and corrosion-resistant, and resistant to chemicals and to heat, thus ensuring a long lifetime with little need for maintenance.

The arrangement of the steel cables in the steel-cable conveyor belt mostly takes the form of a layer in a plane between the cover plates. For reasons related to adhesion and to prevention of corrosion, the steel cables are often galvanized cables, mostly with a diameter from 2.8 to 16.0 mm, and can be composed of about 40 up to 250 individual wires.

In order to improve adhesion, adhesive mixtures, also known as adhesive rubber mixtures, are often also used, intended not only to optimize adhesion as such but also to flow into the steel cables during the vulcanization process in order to allow better sealing. Full penetration through the entire cable, also known as full rubberization, is essential for the lifetime of the steel cable and therefore also for the entire conveyor belt. If full rubberization does not take place, cavities in the cable construction remain open, and it is thus possible that, by way of example, liquids such as water, oils, etc. can migrate within the cable, and progressive oxidation processes, in particular corrosion, can occur, with increased aging and premature failure of the entire conveyor belt. Full penetration of the entire cable construction becomes more difficult as the diameter of the cable increases. In "closed" cable constructions, which are also known as parallel-lay or lang-lay constructions it is almost impossible to achieve full penetration even with relatively small diameters.

Various approaches are known for coating in particular steel cables. On the one hand, a sheathing may be applied to the cables, for example, see inter alia DE 44 38 420 A1, DE 690 29 389 T2, or DE 79 36 995 U1. However, this leads to the disadvantages that have already been mentioned above. The production of an open steel cable construction in which the production is performed by a complex method in a targeted manner while forming additional microgaps into which the rubberization mass may enter during later rubberization is described in DE 694 21 090 T2, for example.

BRIEF SUMMARY OF THE INVENTION

The object of the invention therefore lies in providing a method for producing a tension member that guarantees complete rubberization of the cable such that the number of open cavities is significantly reduced, and thus transportation or migration, respectively, of liquids into the cable construction and above all within the cable construction may be prevented.

The object is achieved in that the method comprises at least the following method steps:

introducing the individual wires of the strand into the stranding head of a stranding machine; and applying at least one coating agent partially or completely in each case to at least 50% of the individual wires prior to twisting the individual wires to form a strand, or simultaneously with twisting the individual wires to form a strand; and twisting the individual wires to form a strand, wherein at least 50% of the individual wires are provided with at least one coating agent; and making a cable from at least one strand.

BRIEF DESCRIPTION OF THE SEVERAL VIEWS OF THE DRAWING

The invention is to be explained in more detail by means of a FIGURE, without being limited thereto.

FIG. 1 shows the method according to the invention by means of a schematic illustration.

DETAILED DESCRIPTION OF THE INVENTION

Coating of the entire tension member is typically performed in an immersion bath. To date, the entire tension member, or the produced cable, respectively, has usually been simply immersed in the immersion bath and pulled out again therefrom. On account thereof, however, only a sheathing on the tension member has been configured, as has already been mentioned at the outset. In comparison with the coating of the already completed cable and/or tension member, as has already been mentioned above, it has surprisingly been found that complete rubberization of the cable and thus also of the tension member arises when the individual wires from which the strand is constructed are already provided with a coating during production of the individual strands of the cable.

This may be performed in a surprisingly simple and cost-effective manner prior to the wires being twisted in a stranding machine.

Complete penetration has until now been difficult in particular in the case of closed cable constructions, and not at all possible in the case of specific cable constructions.

The tension member for the conveyor belt is constructed from at least one cable which is typically composed of a plurality of strands which in turn are composed of individual wires. The cables may be present as a stranded cable or as a helical cable according to DIN EN 12385-2:2002+A1: 2008. They may be lang-lay cables or cross-lay cables.

The strand may preferably be configured as a round strand, a single-layer strand, a Seale, a Warrington, a Filler, a combined parallel-lay, or a compressed strand according to DIN EN 12385-2:2002+A1:2008.

The most popular constructions of the cable are 7×7, having one cable of 7 strands which each are composed of 7 wires, 1×19+7×7, having a core strand of 19 individual wires and outer strands each of 7 wires, and 7×19, having one cable of 7 strands, wherein each strand is composed of 19 wires.

The production of the strands for the tension member is performed by means of a stranding machine, also referred to as a stranding device. Both single as well as double-lay stranding machines may be employed.

According to the invention, in a first method step the individual wires of the strand to be produced are initially introduced into the stranding head of the stranding machine. From there, said individual wires are guided to the twisting unit of the stranding machine. In a first variant, prior to the actual twisting of the individual wires to form a strand in a further subsequent method step, at least one coating agent is in each case applied partially or completely to at least 50%, that is to say to at least half the number, of the individual wires. In a second variant, in a simultaneous method step that, however, is to be considered as being separate, at least one coating agent is in each case partially or completely applied to at least 50% of the individual wires during the actual twisting of the individual wires to form a strand. The coating agent is preferably applied completely in each case to at least 50%, that is to say to at least half, of the total amount of individual wires. Particularly preferably 80%, very particularly preferably all, of the individual wires, that is to say 100% of the individual wires each are partially or completely coated. In the ideal case, thus 100% of the individual wires, that is to say all individual wires, are provided completely with a coating agent.

The application of the coating agent may be performed using all known possibilities. Said application may be performed by spreading, brushing, injecting by means of an injector or an injection device, respectively, or else by spraying, for example by way of a spray device. This may be performed manually or mechanically by way of a respective device. In this way, injecting may be performed through a simple lateral bore in the twisting unit, for example.

At an industrial scale, injecting and/or spraying have/has been proven to be simplest and most cost effective.

The amount of coating agent is to be chosen such that complete rubberization is guaranteed either immediately or else at the latest after the last process step, for example vulcanization of the finished product (for example of the transportation belt), such that the number of cavities is significantly reduced.

To this end injecting or else spraying is particularly suitable, since they both cause a particularly good uniform application of the coating agent, during which the thickness of the coating on the individual wires may also be readily set.

The wires which are provided in such a manner with a coating agent are twisted to form a strand, and are made into a cable in a further process step.

In particular, the core strand of the cable is preferably produced from the wires that have been provided with the coating agent.

The number of the individual wires for the strand, and the number of the strands for the cable herein depend on the desired construction of the tension member.

Depending on the construction, there is the possibility for the finished cable to be coated yet once more from the outside, or else for the entire cable to be provided with the coating mass during the cabling process, so as to reduce any cavities between the strands that may still exist.

The cable is preferably a steel cable, or a steel-hybrid cable, in which at least 20% by volume of the cable is composed of steel.

Thus, the individual wires of the strand are preferably composed of steel or of a steel-hybrid material, for example of an alloy or similar. Or else, the strand may be composed of individual wires composed of steel, and of individual wires composed of a second material that is not steel.

The tension member coated as per the method according to the invention is preferably used for producing conveyor belts or transportation belts, but may also be used in every application where filled steel cables are advantageous. A difference is often made in the literature between conveyor belts and transportation belts. Conveyor belts are typically employed for bulk material (such as coal, ores, sand, cement, etc., for example), while transportation belts are usually utilized for piece goods (parcels etc.).

In general, conveyor belts are longer, wider, thicker, and stronger than transportation belts. However, the two terms are often confused in the general usage of language. The present invention is thus suitable both for conveyor belts as well as for transportation belts in which in each case cables that are constructed substantially from steel are employed.

The coating agent used, or the coating mass used, respectively, is selected depending on the material of the tension member and the construction thereof. To this extent, all known coating materials may be used.

The coating agent is preferably based on at least one elastomer. The elastomer may be rubbers or else thermoplastic elastomers such as polyurethane, for example. However, it is preferably a rubber selected from the group consisting of natural rubber (NR) and/or butadiene rubber (BR) and/or chloro-prene rubber (CR) and/or styrene-butadiene rubber (SBR) and/or nitrile rubber (NBR, HNBR) and/or butyl rubber (IIR) and/or ethylene-propylene rubber (EPM) and/or ethylene-propylene-diene rubber (EPDM) and/or polyacrylate rubber (ACM) and/or epichlorohydrin rubber (ECO) and/or chlorosulfonated polyethylene rubber (CSM) and/or silicone rubber (MVQ) and/or fluoro rubber (FPM). The mentioned types of rubber may here be employed singularly or as blends. Mixtures based on SBR and/or NR and/or BR are particularly well suited as coating agents. In one preferred embodiment, the coating agent also contains at least one softening agent and/or at least one solvent, by way of which the viscosity and/or the adhesion or the stickiness, respectively, of the coating mass may typically be set. However, it is also possible for the coating agent to be free from softening agents and/or solvents.

A further advantage of the method according to the invention lies in that coating agents having relatively high viscosities may also be employed. This leads to a reduction in softening agents and/or solvents. Complete rubberization of the cable is guaranteed by coating the individual wires prior to twisting to form a strand.

Coating agents which after vulcanization of the conveyor belt have a pore structure are particularly well suited.

This pore structure may be effected by employing chemical propellants and/or microspheres which are mixed into the coating. Both inorganic and organic compounds may be employed as a propellant. The propellants herein are usually pore-forming propellant gases such as azo and diazo compounds, for example, which under the influence of heat or catalysts split off gases (N2 or CO2, for example), and thus enable the formation of pores. The propellants herein disintegrate at a specific temperature during processing, with gas formation, or upon the addition of volatile solvents during polymerization or vulcanization, respectively.

The microspheres are hollow balls from glass, phenolic resin, carbon, or a thermoplastic plastics material, having a diameter in the μm range. The microspheres are commercially available in the already expanded form, or else in the expandable form. In order for an increase in volume of the coating to be able to be achieved that leads to optimization of the rubberization, expandable microspheres which are filled with a propellant and expand when heated are preferably used. Microspheres of this type are marketed under the name Expancel© by the Akzo Nobel company, for example.

A combination of expanded and expandable microspheres is possible.

The invention is to be explained in more detail by means of a FIGURE, without being limited thereto.

FIG. 1 shows the method according to the invention by means of a schematic illustration. The individual wires 2, 2', 2", 2'", 2"" are introduced into the stranding head 1 of the stranding machine 10. Prior to, or during twisting of the individual wires 2, 2', 2", 2'", 2"" in the twisting unit 4, at least one coating agent is applied by means of an injector or an injection device 3. A strand 5 results after the individual wires 2, 2', 2", 2'", 2"" have been twisted in the twisting unit 4.

LIST OF REFERENCE SIGNS (PART OF THE SPECIFICATION)

10 Stranding machine
1 Stranding head
2, 2', 2", 2'", 2"" Individual wires
3 Injector, or spray device
4 Twisting unit
5 Strand

What is claimed is:

1. A method for producing a tension member, the method comprising:
   applying a coating agent at least partially to at least 50 percent of a plurality of wires that have been guided into a stranding machine, wherein the coating agent includes a rubber material and expanded microspheres; and
   subsequent to applying the coating agent, twisting the individual wires to form a strand of the tension member.

2. The method of claim 1, further comprising making the tension member from the strand and one or more additional strands.

3. The method of claim 1, further comprising applying the coating agent upon at least 80 percent of the plurality of wires.

4. The method of claim 1, wherein applying the coating agent comprises applying the coating agent completely to at least 50 percent of the plurality of wires.

5. The method of claim 1, wherein each of the plurality of wires is an individual wire.

6. The method of claim 1, further comprising an injector configured to apply the coating agent.

7. The method of claim 1, wherein the formed strand is a core strand of the tension member.

8. The method of claim 1, wherein the tension member is a steel cable.

9. The method of claim 1, wherein the tension member is a steel-hybrid cable.

10. A method for producing a tension member, the method comprising:
    introducing individual wires into a stranding head of a stranding machine;
    guiding the individual wires into the stranding machine;
    subsequent to guiding the individual wires into the stranding machine, applying at least one coating agent at least partially to at least 50% of the individual wires, wherein the at least one coating agent is a rubber material;
    twisting the individual wires to form a strand;
    wherein the at least one coating agent is applied prior to twisting the individual wires to form the strand;
    wherein the coating agent comprises expanded microspheres.

11. The method as claimed in claim 10, wherein the at least one coating agent is partially or completely applied upon at least 80% of the individual wires before the twisting the individual wires to form a strand.

12. The method of claim 10, further comprising applying additional coating agent during the twisting of the individual wires to form the strand.

13. The method of claim 10, further comprising selecting the at least one coating agent based on a tension member material and a tension member construction.

14. The method of claim 10, wherein applying the at least one coating agent comprises brushing the at least one coating agent on to the individual wires.

15. The method of claim 10, forming a cable having a construction of 7×7, where the strand is comprised of 7 wires.

16. The method of claim 10, forming a cable having a construction of 7×19, the strand comprised of 19 wires.

17. The method of claim 10, forming a cable using the strand as a core strand.

18. The method of claim 10, the individual wires comprising steel.

19. The method of claim 10, applying the at least one coating agent to the formed strand after the twisting the wires to form the strand.

20. The method of claim 10, forming a conveyor belt with the strand.

21. The method of claim 10, the microspheres are hollow balls comprised of one or more of glass, phenolic resin, carbon and/or a thermoplastic material.

* * * * *